United States Patent
Vyas et al.

(10) Patent No.: US 10,469,616 B2
(45) Date of Patent: Nov. 5, 2019

(54) DATA DRIVEN BIN PACKING IMPLEMENTATION FOR DATA CENTERS WITH VARIABLE NODE CAPABILITIES

(71) Applicant: Red Hat, Inc., Raleigh, NC (US)

(72) Inventors: Jay Vyas, West Concord, MA (US); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 33 days.

(21) Appl. No.: 15/618,511

(22) Filed: Jun. 9, 2017

(65) Prior Publication Data
US 2018/0359338 A1   Dec. 13, 2018

(51) Int. Cl.
H04L 29/08      (2006.01)
H04L 12/24      (2006.01)
H04L 12/26      (2006.01)

(52) U.S. Cl.
CPC ........ *H04L 67/325* (2013.01); *H04L 41/0806* (2013.01); *H04L 43/08* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | |
|---|---|---|
| 8,656,404 B2 | 2/2014 | Greene et al. |
| 8,694,644 B2 | 4/2014 | Chen et al. |
| 8,949,642 B2 | 2/2015 | Hoyer et al. |
| 9,166,863 B2 | 10/2015 | Vermeulen et al. |
| 9,363,190 B2 | 6/2016 | Beloglazov et al. |
| 9,442,550 B2 | 9/2016 | Neogi et al. |
| 2002/0198985 A1* | 12/2002 | Fraenkel ............. G06F 11/3409 709/224 |
| 2006/0136490 A1* | 6/2006 | Aggarwal ............. G06Q 10/06 |
| 2011/0161470 A1* | 6/2011 | Baskaran ............. G06F 9/5066 709/220 |

(Continued)

OTHER PUBLICATIONS

Weijia Song et al., "Adaptive Resource Provisioning for the Cloud Using Online Bin Packing", Department of Computer Science at Peking University; Department of Computer Science at Princeton University, IEEE Transactions on Computers, vol. X, No. X, X201x, Published 2013, 14 pages.

(Continued)

*Primary Examiner* — Sargon N Nano
*Assistant Examiner* — Christopher B Robinson
(74) *Attorney, Agent, or Firm* — Lowenstein Sandler LLP (57) ABSTRACT

A method includes receiving, by a processing device executing a scheduler, a first request to provision a software application, the request comprising a resource requirement associated with executing the software application, requesting, from a node of a data center, a performance degradation index value of the node, the performance degradation index value reflecting performance degradation of at least one of a processor resource, a memory resource, or a network resource, determining, in view of the performance degradation index values, whether the node meets the resource requirement associated with executing the software application, and responsive to determining that the node meets the resource requirement, provisioning the software application to execute on the node.

18 Claims, 5 Drawing Sheets

(56) References Cited

U.S. PATENT DOCUMENTS

| | | | | |
|---|---|---|---|---|
| 2014/0089480 A1* | 3/2014 | Zhu | ............................ | G06F 9/50 |
| | | | | 709/223 |
| 2015/0039764 A1* | 2/2015 | Beloglazov | ............. | H04L 47/70 |
| | | | | 709/226 |
| 2016/0134596 A1* | 5/2016 | Kovacs | ............... | G06F 21/6281 |
| | | | | 726/7 |

OTHER PUBLICATIONS

Fabien Hermenier et al., "Bin Repacking Scheduling in Virtualized Datacenters", University of Utah, School of Computing; TASC project, Mines Nantes-INRIA, LINA CNRS UMR 6241, Published 2011, 15 pages.

Xibo Jin et al., "Green Data Centers: A Survey, Perspectives, and Future Directions", Institute of Computing Technology, Chinese Academy of Sciences; University of Western Macedonia, Published Aug. 2, 2016, 20 pages.

Anton Beloglazov et al., "Optimal Online Deterministic Algorithms and Adaptive Heuristics for Energy and Performance Efficient Dynamic Consolidation of Virtual Machines in Cloud Data Centers", Cloud Computing and Distributed Systems (CLOUDS) Laboratory Dept. of Computer Science and Software Engineering, The University of Melbourne, Australia, Published 2012, 24 pages.

* cited by examiner

DATA DRIVEN BIN PACKING IMPLEMENTATION FOR DATA CENTERS WITH VARIABLE NODE CAPABILITIES

TECHNICAL FIELD

The present disclosure generally relates to data centers, and more specifically relates to determining the capabilities of nodes in a data center and provisioning software applications to execution environments (e.g., containerized execution environments or virtual machines) on the nodes in view of the determined capabilities.

BACKGROUND

Data centers may be composed of a large number (e.g., hundreds) of interconnected computer servers (referred to as nodes hereinafter). Each node may include one or more processing devices (e.g., central processing units), a memory of a certain size, and a network communication component (e.g., a network interconnect card) of a certain bandwidth. To improve the efficiency of data center operations, each node may be virtualized to support a large number of virtualized execution environments. A virtualized execution environment can be one of virtual machines supported by a virtual machine monitor (VMM) running on the node. The virtual execution environment can also be a container execution environment (e.g., a Docker environment) supported by the node or a virtual machine running on the node.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

A data center may further include a management node to manage the provisioning of software applications to nodes of the data center. The management node can be a special-purpose node that is designated to manage other nodes. In some implementations, the management mode may include a processing device (e.g., a central processing unit (CPU)) configured to run a scheduler. Responsive to receiving a request by a user (e.g., a subscriber of the data center resources) to provision a software application to virtual execution environments on one or more nodes of the data center, the scheduler may determine which nodes are available to execute the software application and provision the software application to one or more available nodes for execution.

In some implementations, the scheduler may employ a bin packing algorithm to determine which nodes to place the requested software application. The bin packing algorithm may model each node as a bin with a capacity, and each virtual execution environment (e.g., a VM or a containerized execution environment) is an item to be packed in the bin. The capacity of the bin can be measured in terms of resources available to software applications running on the node, where the resources may include at least one of a processor capability, a storage capability, or a network capability. A node may have resources to support one or more virtual execution environments that each may consume a certain amount of different resources. The bin packing algorithm may determine the minimum number of nodes to support one or more virtual execution environments (for executing the software application) within the bound of the available resources of the nodes. For example, if a node has a memory capability of four gigabytes and each virtual execution environment requires one gigabyte memory, the node can support up to four virtual execution environments.

In some implementations, the software application can be deployed for execution within a virtual machine environment supported by a node. In other implementations, the software application can be deployed to a node via a container. A container is an execution environment represented by an isolated virtualized user-space instance of an operating system, such that the user-space instance is associated with a kernel instance which may be shared with other containers. The containers may be employed to store the software application code and microservices (e.g., a utility program such as a compiler) for performing operations on the software code. A microservice is an independently-deployable modular service that communicates with other services through a lightweight interface. The code of the software application may be stored along with microservices in containers to create containerized applications.

The containerized application may be released as software product that can be executed as a self-contained application on nodes in a cloud. A node (that can be a host computer or a virtual machine) may support a container execution environment (e.g., Docker environment).

Although bin packing can be cost effective in placing smaller-scale virtual execution environments onto different nodes of a data center, bin packing that does not take into consideration of node performance degradation to additional loads does not perform well in placing large-scale virtual execution environments to nodes because these large-scale virtual execution environments may consume a large amount of resources of a node and adversely affect the overall performance of the node. Thus, the execution of the software application in the large-scale virtual execution environment may degrade the overall performance of the node. Implementations of the present disclosure provide a technical solution of bin packing that takes into account a degradation metric associated with the performance to execute the software application on the node. The implementations of the disclosure may determine that the degradation metric associated with the node exceeds a threshold value, and, in view of the determination, do not place the software application in a virtual execution environment even if the node still have resource capability. Thus, implementations of the disclosure may include a processing device executing a bin packing that can select, in view of the degradation metric measured in real time, one or more nodes of a data center that are less sensitive for receiving additional virtual execution environments.

Figure 1:
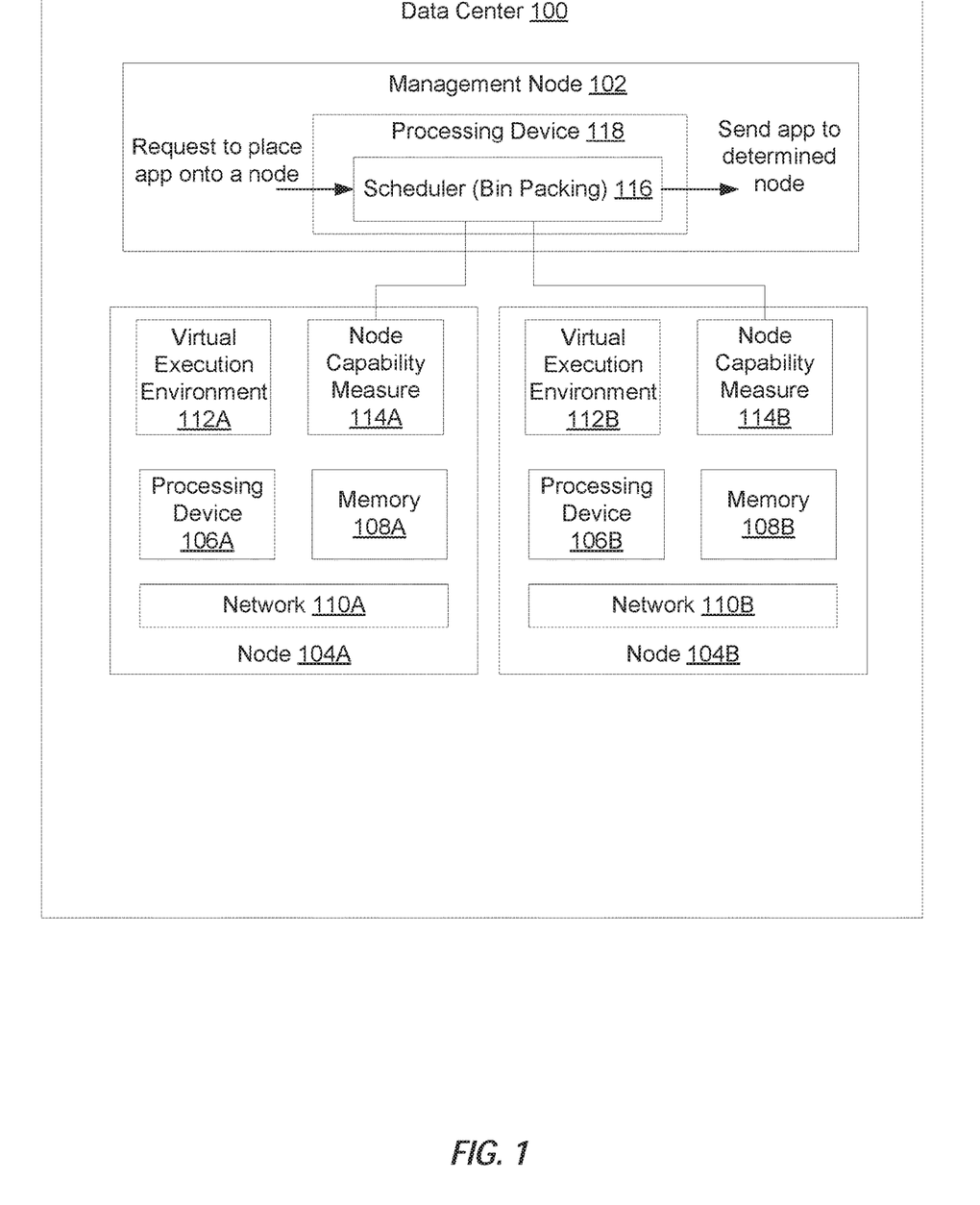
FIG. 1 illustrates a data center including a management node according to an implementation of the present disclosure.

FIG. 1 illustrates a data center 100 including a management node 102 according to an implementation of the present disclosure. Data center 100 may further include nodes 104A, 104B to provide resources that support virtual execution environments such as, for example, VMs and containers. Management node 102 can be a computer system (e.g., a server computer) implementing a certain application programming interface (e.g., Kubernetes API) to facilitate the provision of software applications. Similarly, each of nodes 104A, 104B may be a computer system (e.g., a server computer) to support virtual execution environments for executing a software application.

Management node 102 may include a processing device 118 such as, for example, a central processing unit (CPU) that may execute the program code of software applications. In one implementation, processing device 118 may execute a scheduler application 116 that includes a bin packing component. Scheduler 116 may receive a request (e.g., from a user of data system 100) to place a software application in a virtual execution environment on one of nodes 104A, 104B. In addition to the software application, the request may also include resource capability requirement parameters specifying hardware resources (e.g., processor capability, memory capability, and network capability) needed for executing the software application at a certain performance level. These parameters (that are discussed in detail in the following paragraphs) can be scaled into normalized values that are comparable independent of nodes and types of resources. Responsive to receiving the request including these parameters associated with executing the software application, scheduler 116 may request, from nodes 104A, 104B, their capabilities for different types of resources. For example, the processor capability of a processor resource may be measured in terms of processor clock cycles, the memory capability of a memory resource may be measured in terms of the memory size (e.g., Gigabytes), and the network capability of a networking resource may be measured in terms of bandwidth. Responsive to receiving these requests from scheduler 116, nodes 104A, 104B may perform self-testing to assess the current degradation index values and report the current resource capability status back to scheduler 116. Scheduler 116 may compare the current degradation index values of each node 104A, 104B with the resource capability requirement parameters specified by the user for executing the software application and determine a most suitable node to provide the virtual execution environment for executing the software application, where the most suitable node can be the one that is least sensitive to the load introduced by placing additional virtual execution environments on the node.

In one implementation, nodes 104A, 104B may each include a processing device 116A, 116B such as, for example, a central processing unit (CPU) that may execute software applications. Nodes 104A, 104B may also include storage devices such as, for example, a memory 108A, 108B and/or hard disks (or virtualized disks) that may store the program code of these containerized software applications. Nodes 104A, 104B may also include network components (e.g., network interface cards (NICs) 110A, 110B. The network components may provide the network capabilities such as, for example, bandwidth, for nodes 104A, 104B to a network (e.g., a HTTP network), connect to other nodes in a cloud computing environment. Thus, nodes 104A, 104B may be configured with processor capabilities, memory capabilities, and network capabilities that are shared by virtual execution environments.

Processing devices 112A, 112B of nodes 104A, 104B may support one or more virtual execution environments 112A, 112B. In one implementation, processing devices 112A, 112B may execute a virtual machine monitor (VMM) which is a software program on nodes 112A, 112B that can create and manage virtual machines. VMM may virtualize processing device 106A, 106B to provide a virtual CPU (vCPU), virtualize memory 108A, 108B to provide a virtual memory space to vCPU, and virtualize network components 110A, 110B to be shared by VMs.

In another implementation, node 104A, 104B may be associated with a storage device to store a pod that may contain a collection of containers. Each container may provide a virtualized execution environment for a software application in which the software application may be executed independent of the host operating systems. The containers in the pod may share storage and contexts under which the containers run within the pod. The pod may be assigned a unique identifier (UID) at its creation. The shared context in the pod may include a set of namespaces, control groups, and other attributes associated with the containers in the pod. Containers associated with pod may share an Internet protocol (IP) address and port space, and may communicate with each other using inter-process communications (e.g., semaphores and/or shared memory). The storage shared by containers in the pod is referred to as shared volumes which are defined as part of the pod and are made available to be mounted into each application's file system.

In one implementation, the pod may be specified using a pod configuration file that includes fields to store attribute values of the pod. The attributes stored in the pod may include the unique identifier associated with the pod and a specification field to store container attributes for containers in the pod. For each container in the pod, the specification field may include sub-fields to specify attributes associated with the container. The attributes stored in the pod may further include an environment attribute including pairs of an environment variable and its corresponding value, a list of port attributes that are exposed by the container, and a volume attribute to specify the storage devices (i.e., volumes) that can be mounted by the container.

Referring to FIG. 1, processing device 112A, 112B may execute a node capability measure program 114A, 114B for determining different types of resource capabilities of nodes 104A, 104B. In one implementation, node capability measure program 114A, 114B can be a component of the system software applications (e.g., the host operating system or the VMM) running on processing device 106A, 106B. In another implementation, node capability measure program 114A, 114B can be an application such as, for example, a user application running on processing device 106A, 106B or a user application running in virtual execution environments 112A, 112B. Node capability measure program 114A, 114B can run continuously as a daemon process in the background. Alternatively, processing device 106A, 106B may start to run node capability measure program 114A, 114B in response to receiving a request from scheduler 116 to assess, in real-time, the resource capabilities of node 104A, 104B.

Node capability measure program 114A, 114B, when executed by processing device 106A, 106B, may measure (e.g., by running test programs) different types of resource capabilities available at nodes 104A, 104B. The resource capabilities may vary depending on the virtual execution environments already supported by nodes 104A, 104B. Thus, the resources capabilities at nodes 104A, 104B may vary depending on the current loads at these nodes. In one implementation, the resource capabilities at nodes 104A, 104B may be measured in terms of degradation index values indicating how much capability has been degraded from the full capability. The degradation index value can be a real number within a value range (e.g., [1, 10]). The degradation index value may reflect the sensitivity of a node with respect to one or more resources when a virtual execution environment is added to the node.

The degradation index values can be measured in terms of times needed to perform certain pre-determined tasks. For example, node capability measure program 114A, 114B may measure the time by nodes 104A, 104B to perform tasks that consume a large quantity of one or more types of resources of nodes 104A, 104B. In particular, to determine the processor capability in view of the current load on node 104A, 104B, processing device 106A, 106B may perform a first task of calculating an irrational number (e.g., the π) to an N (e.g., 300,000) of digits using a particular algorithm (e.g., Taylor series expansion) and record a first time period to perform the first task on node 104A, 104B. Further, to determine the memory capability, processing device 106A, 106B may perform a second task of allocating and then de-allocating a large chunk (e.g., 100 MB) of memory for a large number M (e.g., 100) of times and record a second time period to perform the second task on node 104A, 104B. Further, to determine the network capability, processing device 106A, 106B may perform a third task of pinging a network endpoint (e.g., a remote server connected to nodes 104A, 104B via network components 110A, 110B) a large number L (e.g., 10,000) times and record a third time period to perform the third task.

The recorded time periods needed to perform these tasks are indicators of the degradation index values of different types of the resource capabilities at nodes 104A, 104B. In one implementation, to facilitate comparison, the recorded times may be converted into normalized index values (e.g., normalized to an index value in the range of [0, 10]), where the maximum index value may represent the node is at a full capability (no performance degradation) with respect to a resource and the minimum value may represent the node is at the lowest capability (e.g., the lowest capability allowed by a system administrator) with respect to the resource. For example, assuming that the time period for performing a task at a maximum capability (e.g., free of other loads) at a node is $T_{full}$, the time period for performing at the minimum capability at the node is $T_{least}$, and the time period for performing a task issued by the node capability measure program is $T_{curr}$, then the normalized index value representing the current capability can be calculated as $S_{curr}=10*(T_{least}-T_{curr})/(T_{least}-T_{full})$. Thus, when the node is at the full capability, $S_{full}=10$; when the node is at the least capability, $S_{least}=0$. Node capability measure program 114A, 114B may calculate the normalized index value for performing each type of tasks. The normalized index value for performing the $k^{th}$ task is $S_{curr\_k}=10*(T_{least\_k}-T_{curr\_k})/(T_{least\_k}-T_{full\_k})$, where k=1, 2, 3, representing the processor capability, memory capability, and network capability. In one implementation, node capability measure program 114A, 114B may optionally calculate a combined normalized index value. For example, the combined normalized index value may be calculated as $S_{curr\_c}=(S_{curr\_1}+S_{curr\_2}+S_{curr\_3})/3$, where $S_{curr\_c}$ combines the three types of normalized index values to represent the overall performance degradation of a node.

In one implementation, node capability measure program 114A, 114B may run, as shown in FIG. 1, as an independent process (e.g., as a daemon process in the background) on node 104A, 104B. Node capability measure program 114A, 114B may run as a component of a system application (e.g., the operating system or the VMM).

Figure 2:
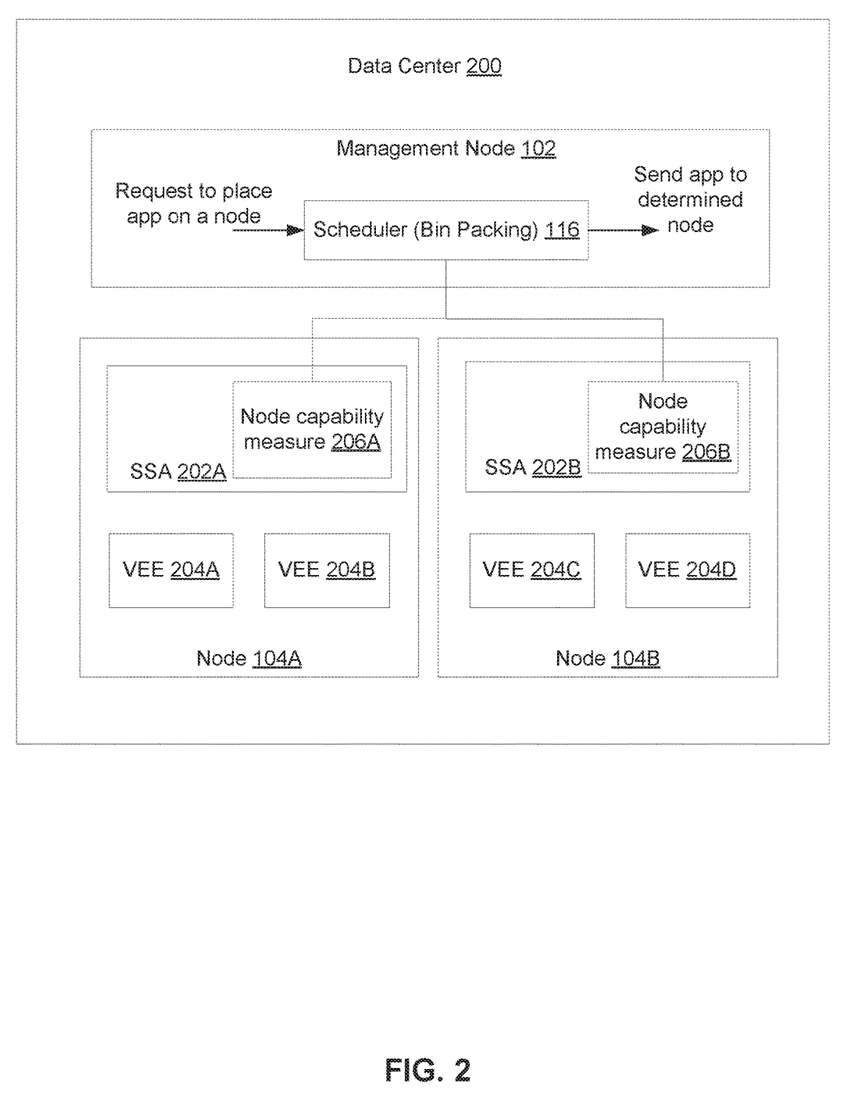
FIG. 2 illustrates a data center including system software applications with a node capability component according to an implementation of the present disclosure.

FIG. 2 illustrates a data center 200 including system software applications with a node capability component 206A, 206B according to an implementation of the present disclosure. Data center 200 may include management node 102, and nodes 104A, 104B similarly labeled as FIG. 1. Management node 102 may include a processing device to execute a scheduler 116 using bin packing to provision software application to a virtual execution environment on nodes 104A, 104B. Node 104A, 104B may include a processing device to execute system software application (SSA) 202A, 202B that can be an operating system or a virtual machine monitor (VMM). SSA 202A, 202B may further support virtual execution environments (VEEs) 204A-204D that can be a virtual machine (VM) or a containerized application. SSA 202A, 202B may include a node capability measure component 206A, 206B that may perform the first, second, and third task and calculate the normalized index values as discussed in conjunction with FIG. 1. The normalized index values may indicate a combined (or different types of) resource capabilities of node 104A, 104B.

In one implementation, node capability measure program 114A, 114B (and similarly, node capability measure component 206A, 206B) may execute different test programs (e.g., the first task, second task, and third task as discussed above) and calculate the normalized index values in response to a request from scheduler 116 or in response to an event occurred at node 104A, 104B (e.g., the addition of a new virtual execution environment that may have changed the load on these nodes). After the calculation, node capability measure program 114A, 114B (and similarly, node capability measure component 206A, 206B) may report the calculated normalized index values to scheduler 116. This may be achieved by storing the calculated normalized index values at a memory location that can be read by processing device 118 and then notifying (e.g., via a system call) the management node 102 of the availability of the calculated normalized index values at the memory location. In response to receiving the notification, processing device 118 may retrieve one or more of these normalized index values.

In another implementation, node capability measure program 114A, 114B (and similarly, node capability measure component 206A, 206B) may execute different test programs and calculate the normalized index values according to a pre-determined schedule (e.g., periodically) and store the calculated normalized index values at a memory location that can be read by processing device 118. The calculated normalized index values at the memory location may indicate the most recent resource capabilities of these nodes. In response to receiving a request by a user to provision a software application on a node in data center 100, processing device 118 may execute scheduler to read normalized index values associated with different nodes from the memory location.

In one implementation, processing device 118 of management node 102 may execute scheduler 116 to receive a request from a user for provisioning a software application on a node in a data center. The request may include a performance degradation requirement parameter for a node to execute the software application. The performance degradation requirement parameter is a value (e.g., supplied by a user) indicating the maximum amount of degradation a user can tolerate with respect to a particular type of resource (e.g., the processor, memory, or network) or a combination of two or more resources (e.g., the combination of the processor, memory, or network). In one implementation, the performance degradation requirement parameter is on the same normalized scale [e.g., in a range of [0, 10]] as the normalized degradation index values calculated by node capability measure program 114A, 114B (or node capability measure components 206A, 206B). Scheduler 116 implementing bin packing may compare the received performance degradation requirement parameter with the normalized degradation index values associated with different nodes 104A, 104B, and select the most suitable node for provisioning the software application in a virtualized execution environment thereon.

In one implementation, scheduler 116 may send a request to node capability measure programs 114A, 114B (or node capability measure components 206A, 206B) to inquire about the normalized index values associated with different nodes 104A, 104B. In another implementation, scheduler 116 may read the normalized index values associated with different nodes from the memory location designated to store these values. In response to receiving the normalized index values associated with the different nodes 104A, 104B, scheduler 116 may run the bin packing to determine, in view of the normalized index values associated with different nodes, which node best meet the requirement associated with the software application and provision the software application to the determined node. Thus, implementations of the present disclosure provide a system and method to allow a user to restrict the provision of software applications to certain nodes that meet the specified resource requirements.

Figure 3:
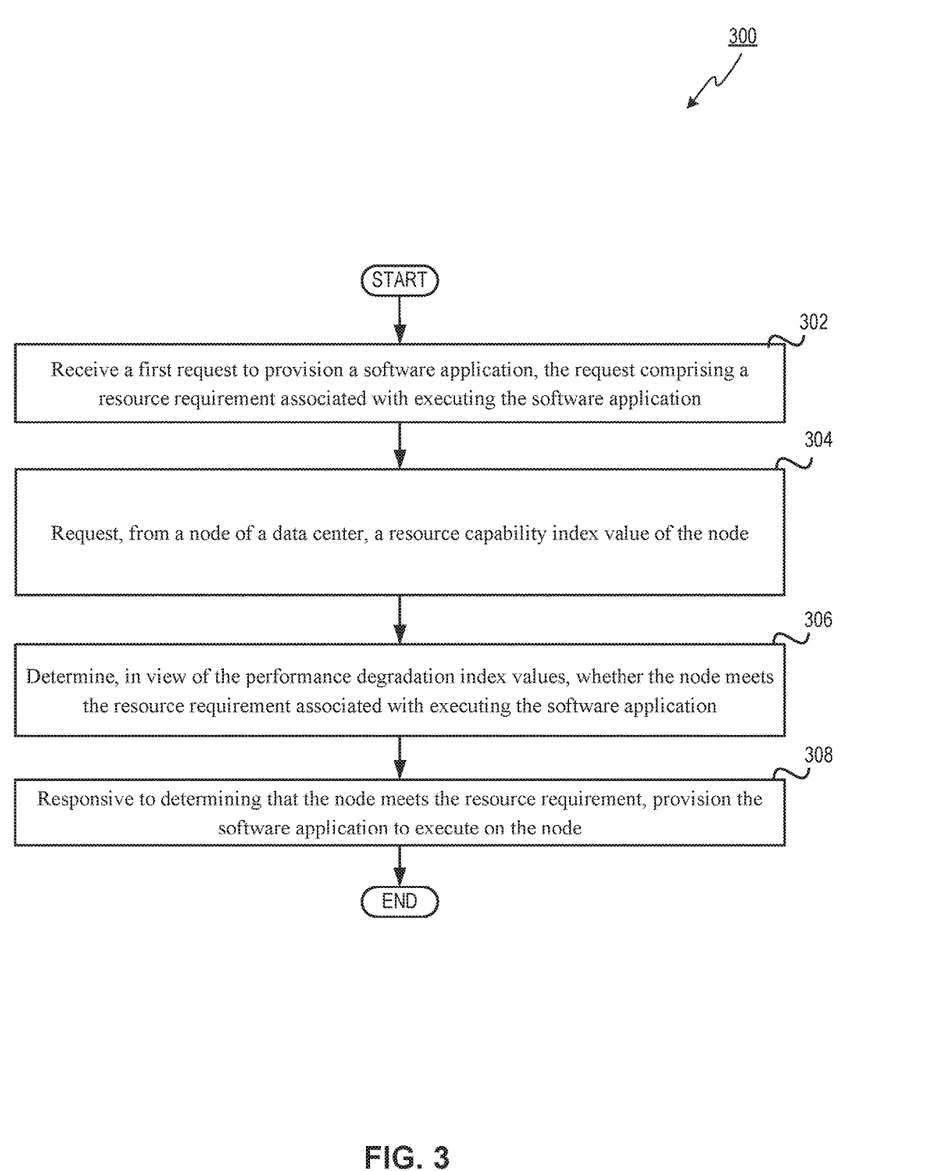
FIG. 3 depicts a flow diagram of a method for provisioning software applications.

FIG. 3 depicts a flow diagram of a method 300 for provisioning software applications. Method 300 may be performed by processing devices that may comprise hardware (e.g., circuitry, dedicated logic), computer readable instructions (e.g., run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by processing device 118 executing scheduler 116 as shown in FIGS. 1 and 2.

Referring to FIG. 3, method 300 may be performed by processing devices of a computing device and may begin at block 302. At block 302, a processing device may receive a first request to provision a software application, the request comprising a resource requirement associated with executing the software application.

At block 304, the processing device may request, from a node of a data center, a performance degradation index value of the node, the performance degradation index value reflecting a performance degradation of at least one of a processor resource, a memory resource, or a network resource.

At block 306, the processing device may determine, in view of the performance degradation index values, whether the node meets the resource requirement associated with executing the software application.

At block 308, the processing device may responsive to determining that the node meets the resource requirement, provision the software application to execute on the node.

Figure 4:
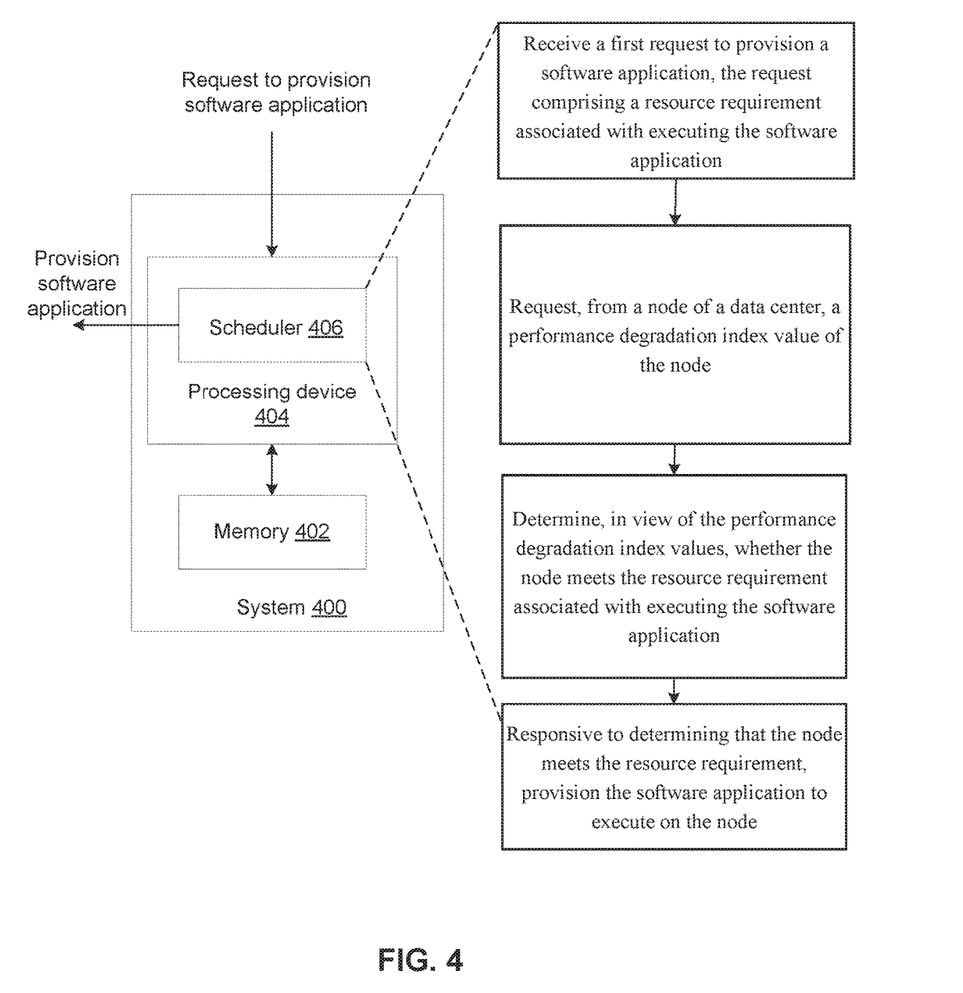
FIG. 4 is a system for provisioning software applications according to an implementation of the present disclosure.

FIG. 4 is a system 400 for provisioning software applications according to an implementation of the present disclosure. System 400 may include a memory 402 and a processing device 404 communicatively coupled to memory 402. The processing device 404 may execute a scheduler (including bin packing) 406 to receive a first request to provision a software application, the request comprising a resource requirement associated with executing the software application, request, from a node of a data center, a performance degradation index value of the node, determine, in view of the performance degradation index values, whether the node meets the resource requirement associated with executing the software application, and responsive to determining that the node meets the resource requirement, provision the software application to execute on the node.

Figure 5:
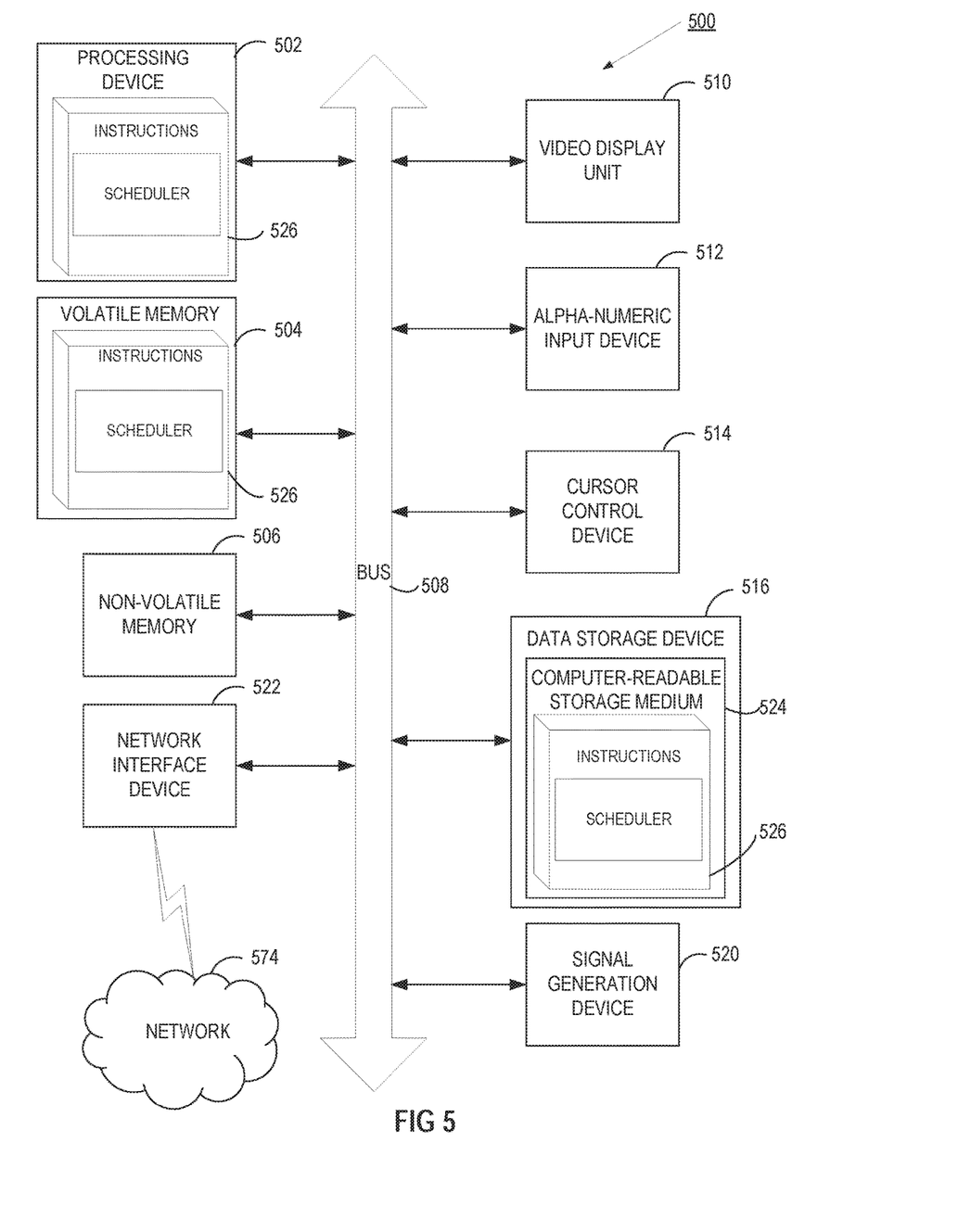
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 400 may correspond to a computing device within system architecture 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW)

microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding output volume control of FIG. 1 for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a processing device executing a scheduler, a first request to provision a software application, the first request comprising a resource requirement associated with executing the software application;
requesting, from a node of a data center, a performance degradation index value of the node, the performance degradation index value indicating sensitivity of the node to adding a virtual execution environment in terms of performance degradation of at least one of a processor resource, a memory resource, or a network resource of the node responsive to addition of the virtual execution environment to the node, wherein the performance degradation index value is measured in terms of time taken to perform determined tasks associated with the at least one of the processor resource, the memory resource, or the network resource of the node, and wherein the time taken to perform the determined tasks comprises a first time period associated with performing a first task that is converted to a processor capability, a second time period associated with performing a second task that is converted to a memory capability, and a third time period associated with performing a third task that is converted to a network capability;
determining, in view of the performance degradation index value, whether the node satisfies the resource requirement associated with executing the software application; and
responsive to determining that the node satisfies the resource requirement, provisioning, using bin packing, the software application to execute on the node in a virtual execution environment.

2. The method of claim 1, wherein the performance degradation index value is a normalized value.

3. The method of claim 1, wherein the node is to:
perform at least one of a first task to measure the processor resource, a second task to measure the memory resource, or a third task to measure the network resource; and
record at least one time period associated with performing the at least one of the first task, the second task, or the third task.

4. The method of claim 1, wherein the node is further to:
store the at least one of the processor capability, the memory capability, or the network capability at a memory location; and
transmit, to the processing device, a notification of existence of the at least one of the processor capability, the memory capability, or the network capability at the memory location.

5. The method of claim 1, wherein the node is to:
calculate the at least one of the processor capability, the memory capability, or the network capability according to a determined schedule.

6. The method of claim 1, wherein provisioning the software application to the node comprises provisioning the software application to a virtual machine supported by the node.

7. The method of claim 1, wherein provisioning the software application to the node comprises provisioning the software application to a container execution environment supported by the node.

8. A system comprising:
a memory; and
a processing device, communicatively coupled to the memory, executing a scheduler to:
receive a first request to provision a software application, the first request comprising a resource requirement associated with executing the software application;
request, from a node of a data center, a performance degradation index value of the node, the performance degradation index value indicating sensitivity of the node to adding a virtual execution environment in terms of performance degradation of at least one of a processor resource, a memory resource, or a network resource of the node responsive to addition of the virtual execution environment to the node, wherein the performance degradation index value is measured in terms of time taken to perform determined tasks associated with the at least one of the processor resource, the memory resource, or the network resource of the node, and wherein the time taken to perform the determined tasks comprises a first time period associated with performing a first task that is converted to a processor capability, a second time period associated with performing a second task that is converted to a memory capability, and a third time period associated with performing a third task that is converted to a network capability;
determine, in view of the performance degradation index value, whether the node satisfies the resource requirement associated with executing the software application; and
responsive to determining that the node satisfies the resource requirement, provision, using bin packing, the software application to execute on the node in a virtual execution environment.

9. The system of claim 8, wherein the performance degradation index value is a normalized value.

10. The system of claim 8, wherein the node is to:
perform at least one of a first task to measure the processor resource, a second task to measure the memory resource, or a third task to measure the network resource; and
record at least one time period associated with performing the at least one of the first task, the second task, or the third task.

11. The system of claim 8, wherein the node is further to:
store the at least one of the processor capability, the memory capability, or the network capability at a memory location; and
transmit, to the processing device, a notification of existence of the at least one of the processor capability, the memory capability, or the network capability at the memory location.

12. The system of claim 8, wherein the node is to:
calculate the at least one of the processor capability, the memory capability, or the network capability according to a determined schedule.

13. The system of claim 8, wherein to provision the software application to the node, the processing device is to provision the software application to a virtual machine supported by the node.

14. The system of claim 8, wherein to provision the software application to the node, the processing device is to provision the software application to a container execution environment supported by the node.

15. A computer-readable non-transitory medium stored thereon codes that, when executed by a processing device, cause the processing device to:
receive, by the processing device executing a scheduler, a first request to provision a software application, the first request comprising a resource requirement associated with executing the software application;
request, from a node of a data center, a performance degradation index value of the node, the performance degradation index value indicating sensitivity of the node to adding a virtual execution environment in terms of performance degradation of at least one of a processor resource, a memory resource, or a network resource of the node responsive to addition of the virtual execution environment to the node, wherein the performance degradation index value is measured in terms of time taken to perform determined tasks associated with the at least one of the processor resource, the memory resource, or the network resource of the node, and wherein the time taken to perform the determined tasks comprises a first time period associated with performing a first task that is converted to a processor capability, a second time period associated with performing a second task that is converted to a memory capability, and a third time period associated with performing a third task that is converted to a network capability;
determine, in view of the performance degradation index value, whether the node satisfies the resource requirement associated with executing the software application; and
responsive to determining that the node satisfies the resource requirement, provision, using bin packing, the software application to execute on the node in a virtual execution environment.

16. The computer-readable non-transitory medium of claim 15, wherein the performance degradation index value is a normalized value specified over a pre-determined value range.

17. The computer-readable non-transitory medium of claim 16, wherein the node is to:
perform at least one of a first task to measure the processor resource, a second task to measure the memory resource, or a third task to measure the network resource; and record at least one time period associated with performing the at least one of the first task, the second task, or the third task.

18. The computer-readable non-transitory medium of claim 15, wherein to provision the software application to the node, the processing device is to provision the software application to one of a virtual machine or a container execution environment supported by the node.

\* \* \* \* \*